(12) United States Patent
Cho

(10) Patent No.: US 6,661,669 B1
(45) Date of Patent: Dec. 9, 2003

(54) UNINTERRUPTED POWER SUPPLY

(76) Inventor: Albert Cho, 3F, No. 1, Lane 37, Ming-Yuan St., San-Chung City, Taipei (TW)

( * ) Notice: Subject to any disclaimer, the term of this patent is extended or adjusted under 35 U.S.C. 154(b) by 0 days.

(21) Appl. No.: 10/180,336

(22) Filed: Jun. 27, 2002

(51) Int. Cl.7 .................................................. H05K 5/00
(52) U.S. Cl. ........................ 361/752; 361/801; 307/150
(58) Field of Search ................................. 361/752, 753, 361/759, 796, 801–803, 725–727, 690, 692, 693, 694, 695, 600, 679; 307/150

(56) References Cited

U.S. PATENT DOCUMENTS

| | | | |
|---|---|---|---|
| 5,596,479 A | * | 1/1997 | Campbell et al. ............ 361/643 |
| 6,121,889 A | * | 9/2000 | Janda et al. ............ 340/815.47 |
| 6,200,159 B1 | * | 3/2001 | Chou .......................... 439/535 |
| 6,294,721 B1 | * | 9/2001 | Oravetz et al. .............. 136/242 |
| 6,421,233 B1 | * | 7/2002 | Hong .......................... 361/683 |
| 6,456,507 B1 | * | 9/2002 | Yang et al. .................. 361/829 |
| 6,476,729 B1 | * | 11/2002 | Liu ........................ 340/870.11 |

* cited by examiner

Primary Examiner—David Martin
Assistant Examiner—Thanh S. Phan
(74) Attorney, Agent, or Firm—Birch, Stewart, Kolasch & Birch LLP

(57) ABSTRACT

A structure of UPS comprises a case having an opening over which is mounted a cover. A fastening slot is provided on an inner side of the case proximate to the opening. Two outer lateral sides of the case further include a plurality of heat dissipating elements. The cover further includes at least a fastening projection corresponding to the fastening slot. The cover thereby detachably assembles with the case to enable a change of internal components of the UPS. The structure of the UPS further comprises an annular voltage transformer having a reduced size, the general size of the UPS is thereby reduced to allow convenient carrying and easy mounting in a reduced mounting space.

9 Claims, 5 Drawing Sheets

UNINTERRUPTED POWER SUPPLY

FIELD OF THE INVENTION

The invention relates to an uninterrupted power supply and, more particularly, to an uninterrupted power supply that is dimensionally reduced so as to enable a convenient mounting.

BACKGROUND OF THE INVENTION

Uninterrupted power supply (UPS) devices of approximately 1000 watts or less electrical power are principally used in computers, computer peripheral components, or other conventional machines. In the case of computers, because some data stored in the memory when the computer is turned on may be subsequently erased if the power is turned off, the UPS device allows to provide the necessary power supply when the external local power is turned off. The UPS is therefore an important device that enables to prevent accidental data erasure due to power supply cutoff.

The general structure of a traditional UPS device principally comprises a connecting circuitry, an iron-core voltage transformer electrically connected to the connecting circuitry, and a charging battery electrically connected to the connecting circuitry and a voltage converter. Thereby, a direct voltage of the charging battery can be converted to an alternating voltage of city local power supply to prevent a cutoff of the power source. However, regardless of stand-by state or online state, the above structure is a closed assembly structure, and the iron-core voltage transformer necessitates a substantial occupation space, which increases the external size of the UPS detrimental to its mount. Moreover, the charging battery may be completely attached in the inner structure of the UPS. To change the charging battery, the entire structure of the UPS thus has to be dismantled, which is inconvenient and may further damage the external aesthetic aspect of the UPS. The above disadvantages therefore do not satisfy the demands of UPS with a smaller size.

SUMMARY OF THE INVENTION

Accordingly, it is therefore a principal object of the invention to provide a structure of uninterrupted power supply (UPS) with a reduced size to overcome the above inconveniences.

To attain the above and other objectives, a structure of UPS of the invention comprises a case having an opening over which is mounted a cover. A fastening slot is provided on an inner side of the case proximate to the opening. Two outer lateral sides of the case further include a plurality of heat dissipating elements. The cover further includes at least a fastening projection corresponding to the fastening slot. The cover thereby detachably assembles with the case to enable a change of internal components of the UPS. The structure of the UPS further comprises an annular voltage transformer having a reduced size, the general size of the UPS is thereby reduced to allow convenient carrying and easy mounting in a reduced mounting space.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief introduction of the drawings is as follows.

DETAILED DESCRIPTION OF THE EMBODIMENTS

Figure 1:
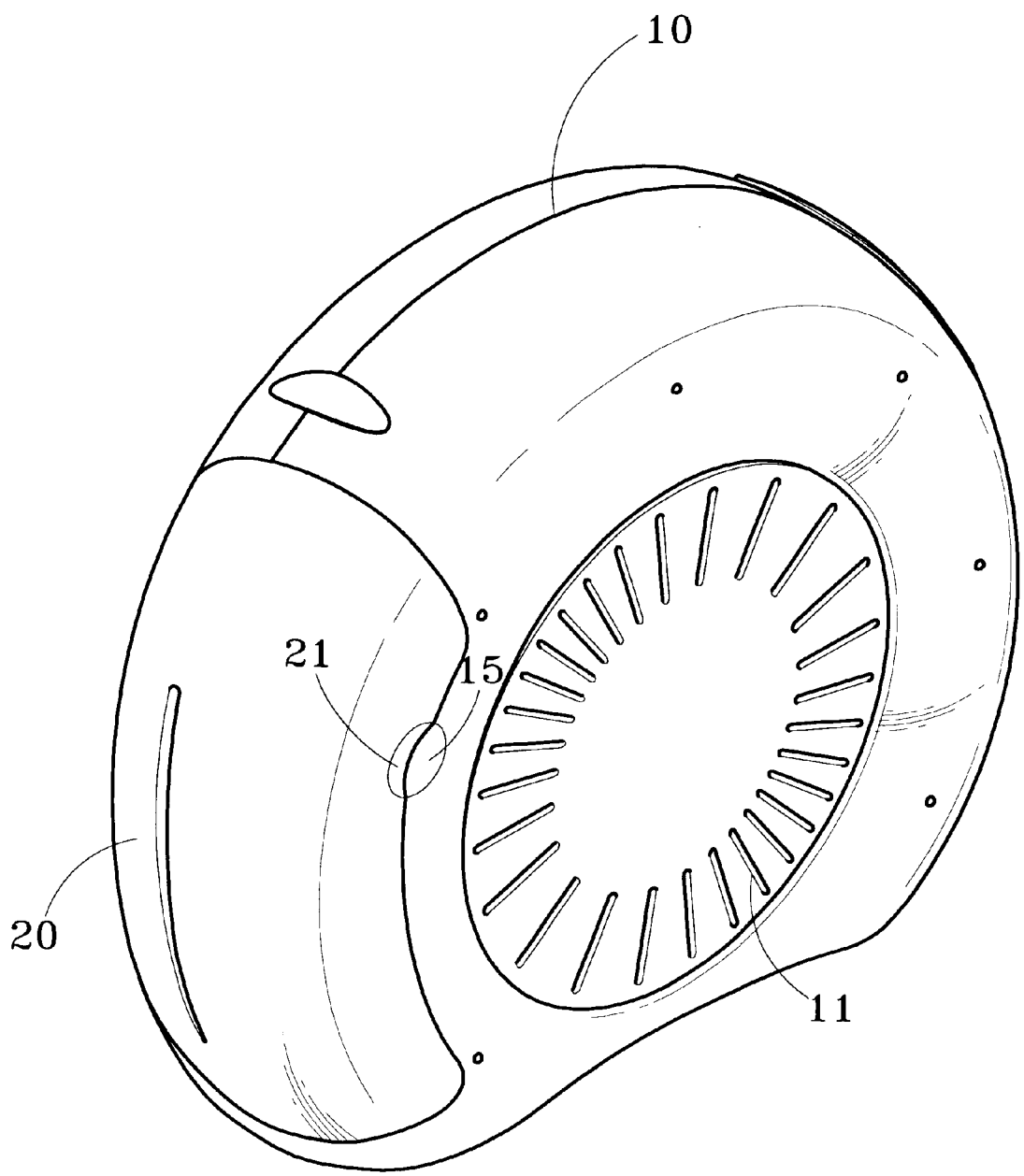
FIG. 1 is a general perspective view of a structure of uninterrupted power supply according to an embodiment of the invention.

Wherever possible in the following description, like reference numerals will refer to like elements and parts unless otherwise illustrated.

Figure 2:
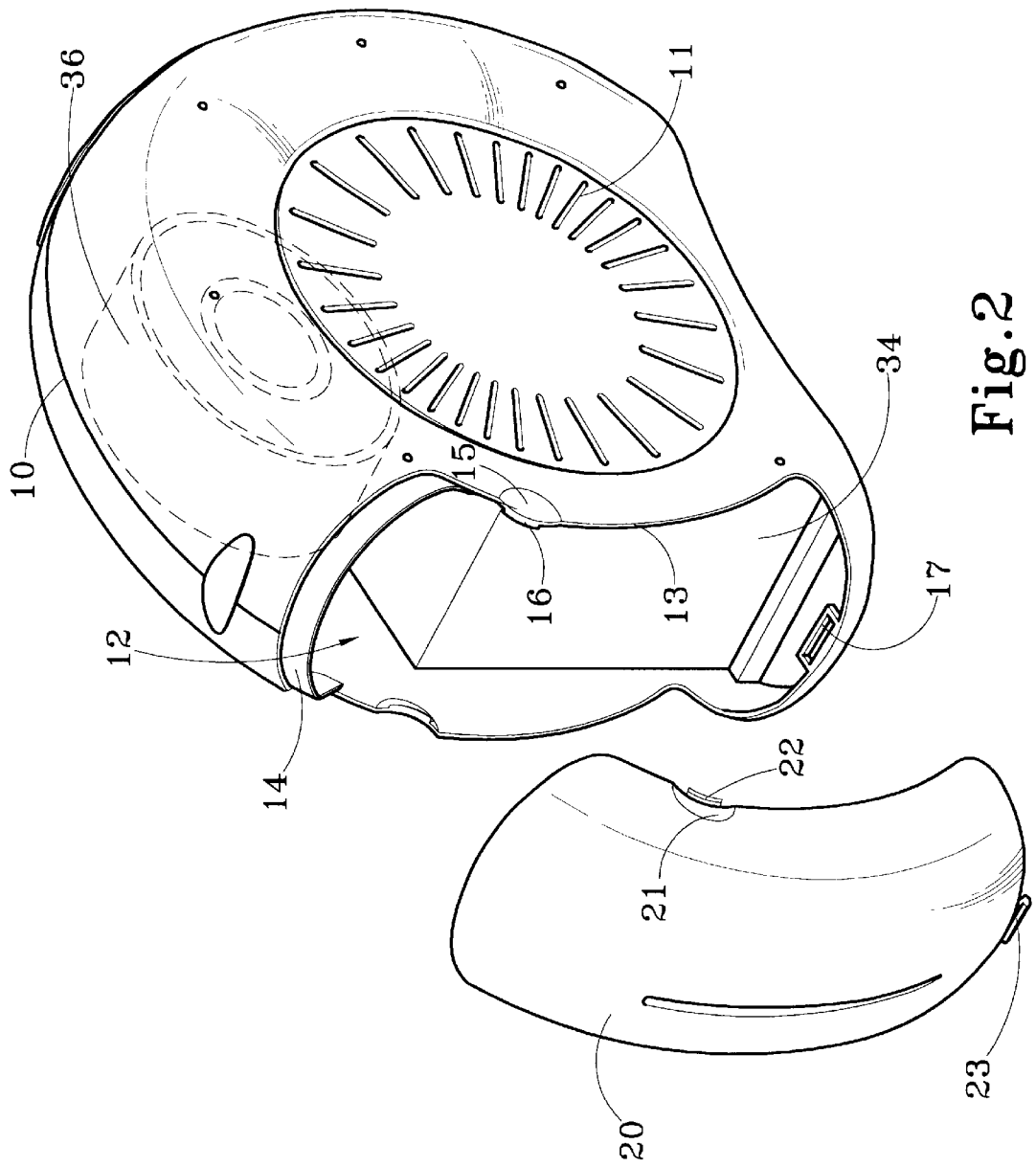
FIG. 2 is an assembly view of a cover with a case of a structure of uninterrupted power supply according to an embodiment of the invention.

FIG. 1 and FIG. 2 are respectively a general perspective view and an assembly of an uninterrupted power supply according to an embodiment of the invention. As illustrated, a structure of uninterrupted power supply (UPS) of the invention comprises a case 10 in which is mounted an annular voltage transformer 36, a cover 20 mounted to the case 10, and heat dissipating elements 11 disposed in radiating manner correspondingly on two lateral sides of the case 10. Via a detachable mount of the cover 20 on the case 10, the user can conveniently change the internal components of the UPS. Furthermore, by using an annular voltage transformer 36 that has a dimensionally reduced size, the general size of the UPS is reduced to allow a convenient carrying and a reduced space occupation. Via the heat dissipating elements 11, the heat irradiated from the internal components is further effectively dissipated.

The case 10 includes a receiving space 12 that extends to a side of the case 10 into an opening 13. Upper and lower sides of the opening 13 are delimited via arcuate sealing edges 14. Two opposite lateral sides of the case 10 are further provided with first recesses 15 at respective locations of which the inner side of the case 10 includes fastening portions 16. At a location proximate to the opening 13, an inner side of the case 10 includes a fastening slot 17.

Two lateral sides of the cover 20 include corresponding second recesses 21 at respective locations of which the inner side of the cover 20 further includes fastening projections 22. An edge of the cover 20 is further provided with a fastening projection 23 corresponding to the fastening slot 17. Via a profile-compliant abutment of the cover 20 against the opening 13 and engagements of the fastening projections 22, 23 with the fastening portions/slots 16, 17, the UPS is thereby fixedly assembled with a reduced size and secured structure.

Figure 3:
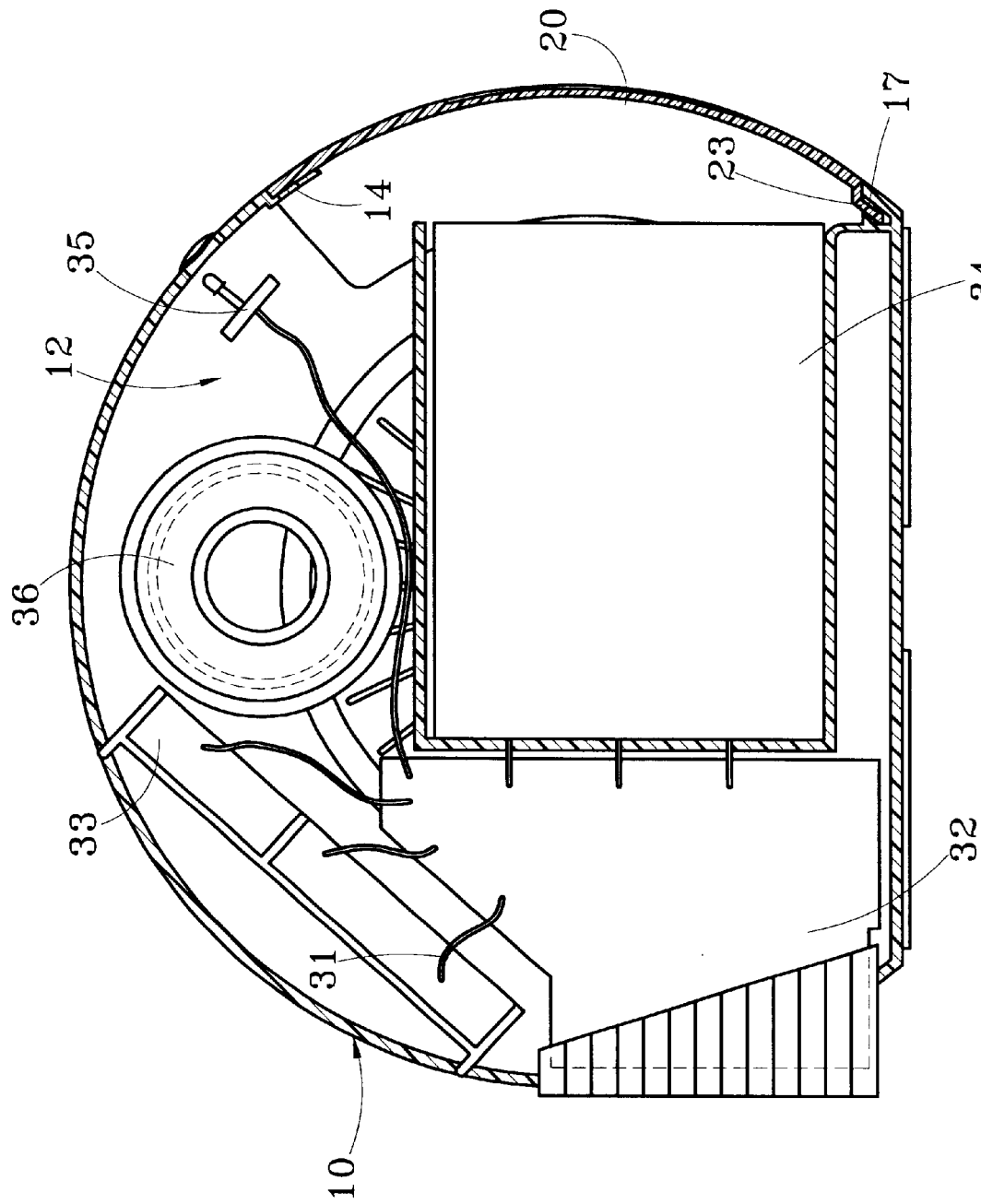
FIG. 3 is a sectional view of an electrical connection of a structure of uninterrupted power supply according to an embodiment of the invention.

Now referring to FIG. 3, a sectional view schematically shows the electrical connection of the UPS according to an embodiment of the invention. The case 10 can assemble a plurality of components therein. As illustrated, the case 10 comprises a printed circuit board (PCB) 32 that carries a circuitry of the UPS, a power source socket 33 and a display unit 35 electrically connected to the circuitry, and a charging battery 31 electrically connected to the PCB 32. At a location between the PCB 32, the power source socket 33 and the charging battery 34 is disposed the annular voltage transformer 36 capable of converting the power from the charging battery 34. The charging battery 34 is mounted in the case 10 in a manner to be easily detached and mounted in. The annular voltage transformer 36 is mounted at an upper location in the case 10, and has a size that is smaller than conventional iron-core voltage transformer. If a local power supply no longer is provided at wall sockets, a direct low voltage of the charging battery 34 is converted to a high alternating voltage typical of the local power supply via the annular voltage transformer 36. Via the electrical circuit comprised of the charging battery 34, the circuitry, the power socket 33, the display unit 35 and the annular voltage transformer 36, high alternating power therefore is continuously provided even if local power supply is cut off. The UPS of the invention can therefore immediately provide electrical power to replace for local power supply deficiency.

As described above, the charging battery 34 is mounted in the case 10 in a manner to be easily removed there from. In this purpose, the design of the cover 20 and the heat dissipating elements 11 can be correspondingly modified in accordance with the user's demand (not shown). Furthermore, by achieving a simple assembly or detaching action exerted on the fastening projections 22, 23 with respect to the fastening portions/slots 16, 17, the case 10 and the cover 20 are easily assembled and detached, thereby achieving a UPS with a reduced size and easy assembly/detaching operations.

Figure 4:
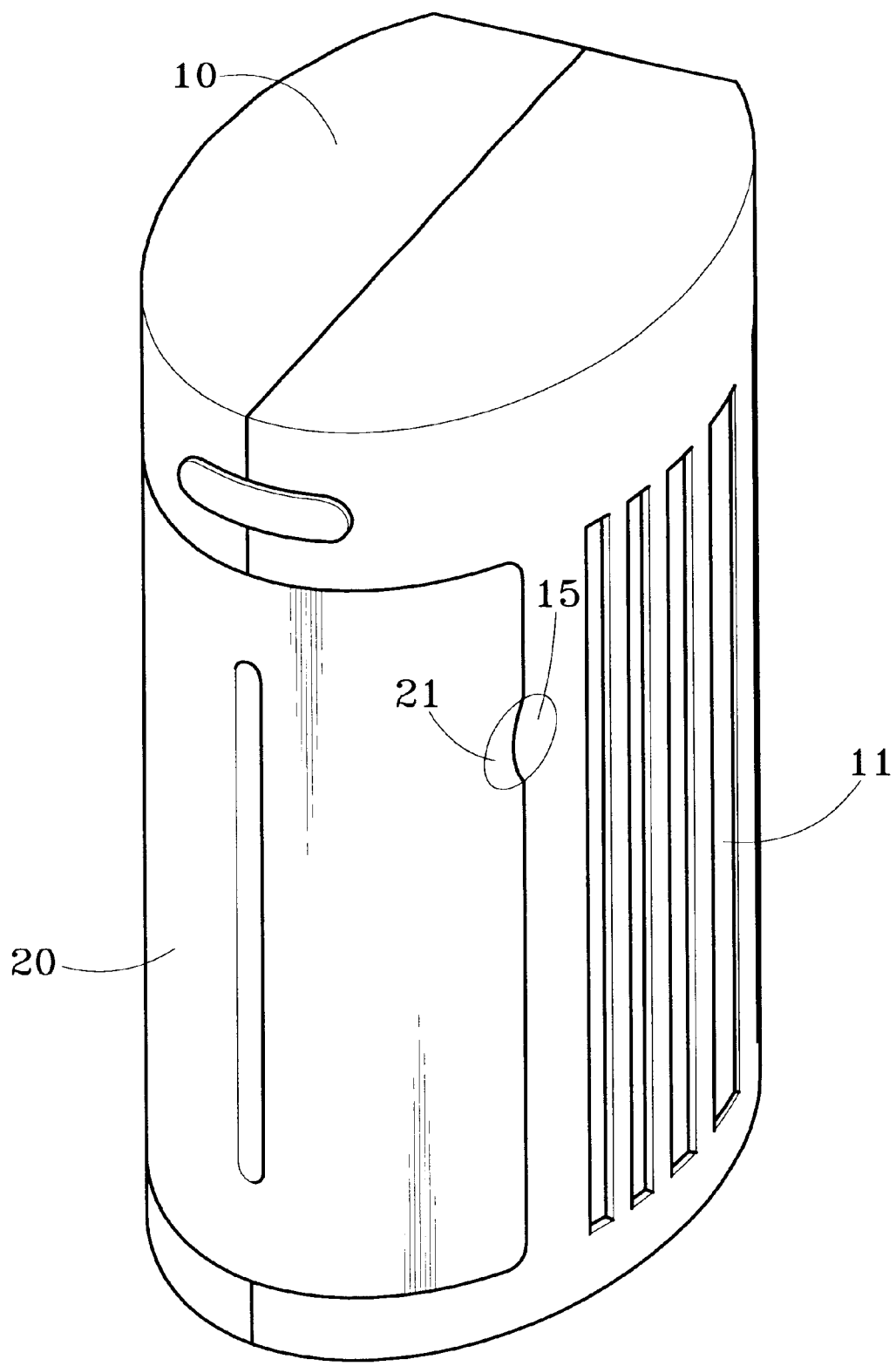
FIG. 4 and FIG. 5 are two general perspective views showing different variations of the invention.
Figure 5:
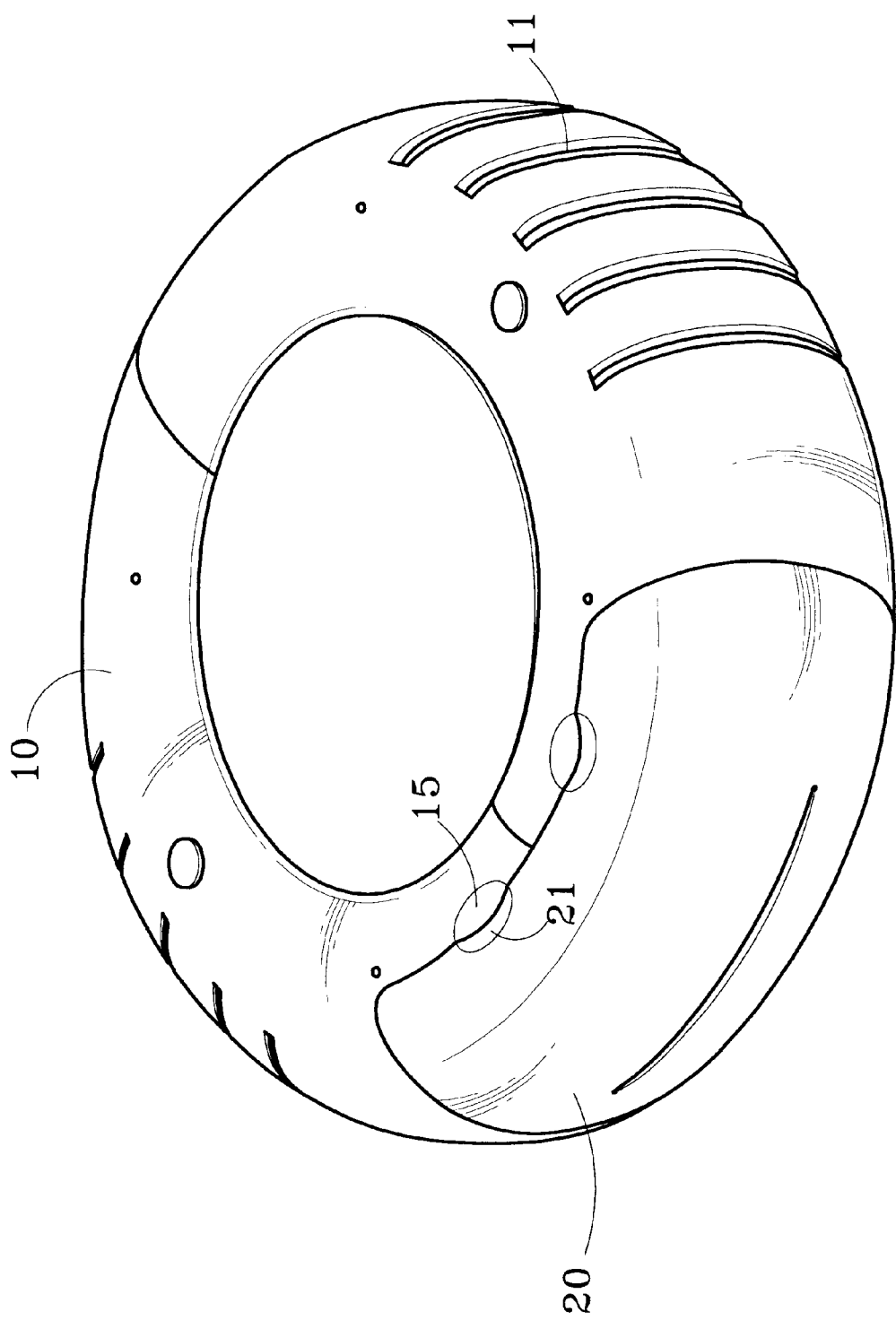

Now referring to FIG. 4 and FIG. 5, two schematic views illustrate two other variations of the invention. As illustrated, the shape of the case 10 can be differently shaped in arcuate shape, cylindrical shape, ellipsoid shape, etc. to achieve a pleasant aesthetic aspect. The shapes of the opening 13 and the cover 20 and the placement of the heat dissipating elements 11 (in radiating or parallel manner) are designed in a manner to match with the shape of the case 10, thereby achieving an aesthetic assembly of the case 10 with the cover 20.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A structure of uninterrupted power supply (UPS), comprising:

a case including a surface that is formed with an opening, a fastening slot on an inner side proximate to the opening, and a plurality of heat dissipating elements on two opposite lateral sides; and a cover, mounted over the opening, the cover including a fastening projection corresponding to the fastening slot, thereby a detachable assembly of the cover with the case is achieved to allow a user to change internal components mounted in the case;

two respectively lateral sides of the case and cover respectively include corresponding first and second recesses that enable an assembly and detachment of the cover and case.

2. The structure of claim 1, wherein the case is differently shaped in arcuate shape, cylindrical shape, or ellipsoid shape.

3. The structure of claim 2, wherein the opening and the cover match with the shape of the case.

4. The structure of claim 1, wherein the heat dissipating elements are placed in a radiating manner, parallel, or arcuate.

5. The structure of claim 1, wherein an upper/lower side of the opening is further provided with a sealing edge.

6. The structure of claim 1, wherein inner sides of the case corresponding to the respective locations of the first recesses further respectively include fastening portions, and inner sides of the cover corresponding to the respective locations of the second recesses further respectively include fastening projections.

7. The structure of claim 1, wherein the case internally comprises a printed circuit board (PCB) that carries a circuitry of the (UPS), a power source socket and a display unit electrically connected to the circuitry, and a charging battery electrically connected to the PCB.

8. The structure of claim 1, wherein the case further includes an annular voltage transformer that allows a size reduction of the UPS.

9. The structure of claim 1, wherein the cover and the heat dissipating elements are achieved with an interchangeable design structure.

* * * * *